(12) United States Patent
Remboski et al.

(10) Patent No.: US 10,857,878 B2
(45) Date of Patent: Dec. 8, 2020

(54) DRIVELINE INCLUDING A VARIABLE END REDUCER ASSEMBLY

(71) Applicant: Neapco Intellectual Property Holdings, LLC, Farmington Hills, MI (US)

(72) Inventors: Donald Remboski, Ann Arbor, MI (US); Jacqueline Dedo, Wolverine Lake, MI (US)

(73) Assignee: NEAPCO INTELLECTUAL PROPERTY HOLDINGS, LLC, Farmington Hills, MI (US)

( * ) Notice: Subject to any disclaimer, the term of this patent is extended or adjusted under 35 U.S.C. 154(b) by 129 days.

(21) Appl. No.: 16/159,997

(22) Filed: Oct. 15, 2018

(65) Prior Publication Data

US 2019/0111908 A1    Apr. 18, 2019

Related U.S. Application Data

(60) Provisional application No. 62/572,634, filed on Oct. 16, 2017.

(51) Int. Cl.
| | |
|---|---|
| *F16H 37/08* | (2006.01) |
| *B60K 17/04* | (2006.01) |
| *F16H 37/04* | (2006.01) |
| *B60K 1/00* | (2006.01) |
| *F16H 48/36* | (2012.01) |

(52) U.S. Cl.
CPC .............. *B60K 17/046* (2013.01); *B60K 1/00* (2013.01); *F16H 37/046* (2013.01); *F16H 37/082* (2013.01); *B60K 2001/001* (2013.01); *F16H 2048/368* (2013.01)

(58) Field of Classification Search
CPC .... B60K 17/16; B60K 17/165; B60K 17/046; F16H 37/082; F16H 2048/368
See application file for complete search history.

(56) References Cited

U.S. PATENT DOCUMENTS

| | | |
|---|---|---|
| 3,115,204 A | 12/1963 | Dence |
| 4,083,421 A | 4/1978 | Van Horn et al. |
| 5,024,636 A | 6/1991 | Phebus et al. |
| (Continued) | | |

FOREIGN PATENT DOCUMENTS

EP    2620311 A1 *  7/2013  ........... F16H 37/082

OTHER PUBLICATIONS

International Search Report; PCT/US2018/055988; dated Feb. 6, 2019; 3 pages.

*Primary Examiner* — David R Morris
(74) *Attorney, Agent, or Firm* — Dickinson Wright PLLC

(57) ABSTRACT

A driveline assembly for a vehicle including at least one primary shaft rotatable about an axis. At least one reducer assembly is coupled with the at least one primary shaft. The reducer assembly includes a sun gear rotatable with the primary shaft. A plurality of planet gears are rotatable about the sun gear. A ring is positioned about the planet gears. A planet carrier is rotatably connected to a center of each of the planet gears. An output shaft is fixed to the planet carrier. A sliding clutch fixes the ring to a ground in a high torque position to provide a gear reduction, and fixes the ring to the planet carrier in a low torque position to provide a 1:1 gear ratio. A method for operating such a driveline assembly is also provided.

4 Claims, 3 Drawing Sheets

(56) References Cited

U.S. PATENT DOCUMENTS

| | | | |
|---|---|---|---|
| 6,117,040 A | 9/2000 | Watterodt et al. | |
| 6,652,405 B2 | 11/2003 | Staheli et al. | |
| 2006/0052207 A1* | 3/2006 | Teraoka | F16H 48/30 475/231 |
| 2010/0240485 A1* | 9/2010 | Strasser | B60W 10/08 475/150 |
| 2011/0259657 A1 | 10/2011 | Fuechtner | |
| 2013/0281247 A1* | 10/2013 | Holmes | B60K 6/52 475/150 |
| 2013/0296097 A1 | 11/2013 | Borntraeger | |
| 2019/0111802 A1* | 4/2019 | Remboski | B60W 10/08 |

* cited by examiner

DRIVELINE INCLUDING A VARIABLE END REDUCER ASSEMBLY

CROSS-REFERENCE TO RELATED APPLICATIONS

This U.S. patent application claims the benefit of U.S. Provisional Patent Application Ser. No. 62/572,634 filed Oct. 16, 2017, entitled "Driveline Including a Variable End Reducer Assembly," the entire disclosure of the application being considered part of the disclosure of this application and hereby incorporated by reference.

FIELD OF THE DISCLOSURE

A driveline assembly for a motor vehicle. More particularly, a driveline assembly including at least one reducer assembly positioned adjacent to a wheel output for providing variable torque multiplying effects.

BACKGROUND OF THE INVENTION

Electric vehicles are known to include a driveline assembly for driving one or more wheels. The driveline assembly typically includes a center section that has an electric motor with an output shaft that is connected to a differential. The differential is coupled with a pair of primary axles for transmitting torque from the output shaft to the primary axles and a pair of the wheels. A gear reducer is typically positioned between the output shaft and the differential for providing a gear reduction prior to the transmittal of torque to the primary shafts. This lumped architecture leads to heavy torque loading on the primary axles and heavy structural loading on chassis components that support the center section. These factors combine to provide relatively high mass and package space requirements for the driveline assembly. Furthermore, the gear reducer is typically configured to only provide a single gear reduction, thus not always optimizing the electric motor's efficiency and size. Accordingly, there remains a need for improvements to such driveline assemblies.

SUMMARY OF THE INVENTION

According to an aspect of the disclosure, a driveline assembly for a vehicle is provided. The driveline assembly includes at least one primary shaft for driving a wheel. The at least one primary shaft is rotatable about an axis. At least one reducer assembly is coupled with the at least one primary shaft. The reducer assembly includes a sun gear that is rotatable about the axis with the primary shaft. A plurality of planet gears are meshed with and rotatable about the sun gear. Each of the sun gears has a center. A ring is positioned about and meshed with the planet gears. A planet carrier is rotatably connected to the center of each of the planet gears and rotatable about the axis. An output shaft is fixed to the planet carrier and rotatable about the axis. A sliding clutch is movable between a high torque position and a low torque position. The sliding clutch fixes the ring to a ground in the high torque position to provide a gear reduction between the primary shaft and the wheel output, and the sliding clutch fixes the ring to the planet carrier in the low torque position to provide a 1:1 gear ratio between the input shaft and the wheel output. A controller is connected with the sliding clutch for selectively providing shifting between the high torque and low torque positions.

The combination of the electric motor packaged with the reducer assemblies adjacent to the wheel outputs allows the various driveline components to be small and lightweight. Therefore, interior space of the vehicle is increased and vehicle mass is reduced. Additionally, because the reducer assemblies can provide variable gear ratios and coordinated shifting, the electric motor's efficiency and size may be tuned for particular applications.

According to a further aspect of the disclosure, a method for operating a driveline assembly for a vehicle is provided. The method includes driving an output of an electric motor at a no-torque speed at which no torque is transmitted to a first primary shaft and a second primary shaft through a differential, wherein the first primary shaft is coupled with a first wheel output and the second primary shaft is coupled with a second wheel output. The method further includes shifting a first sliding clutch into a neutral position, wherein the first sliding clutch is positioned between the first primary shaft and the first wheel output. The method also includes shifting a second sliding clutch into a neutral position, wherein the second sliding clutch is positioned between the second primary shaft and the second wheel output. The method further includes driving the output of the electric motor such that the speed of the first primary shaft matches the speed of the first wheel output while the first sliding clutch is in the neutral position. The method further includes shifting the first sliding clutch from the neutral position into an engaged position while the speed of the first primary shaft matches the speed of the first wheel output, and wherein the first sliding clutch causes a predetermined gear ratio to be provided between the first primary shaft and the first wheel output when the first sliding clutch is in the engaged position. The method also includes driving the output of the electric motor such that the speed of the second primary shaft matches the speed of the second wheel output while the second sliding clutch is in the neutral position. The method further includes shifting the second sliding clutch from the neutral position into an engaged position while the speed of the second primary shaft matches the speed of the second wheel output, and wherein the second sliding clutch causes a predetermined gear ratio to be provided between the second primary shaft and the second wheel output when the second sliding clutch is in the engaged position.

Accordingly, the method provides for coordinated shifting of the range unit of the wheels for optimizing efficiency of the electric motor from a simple, low mass configuration.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
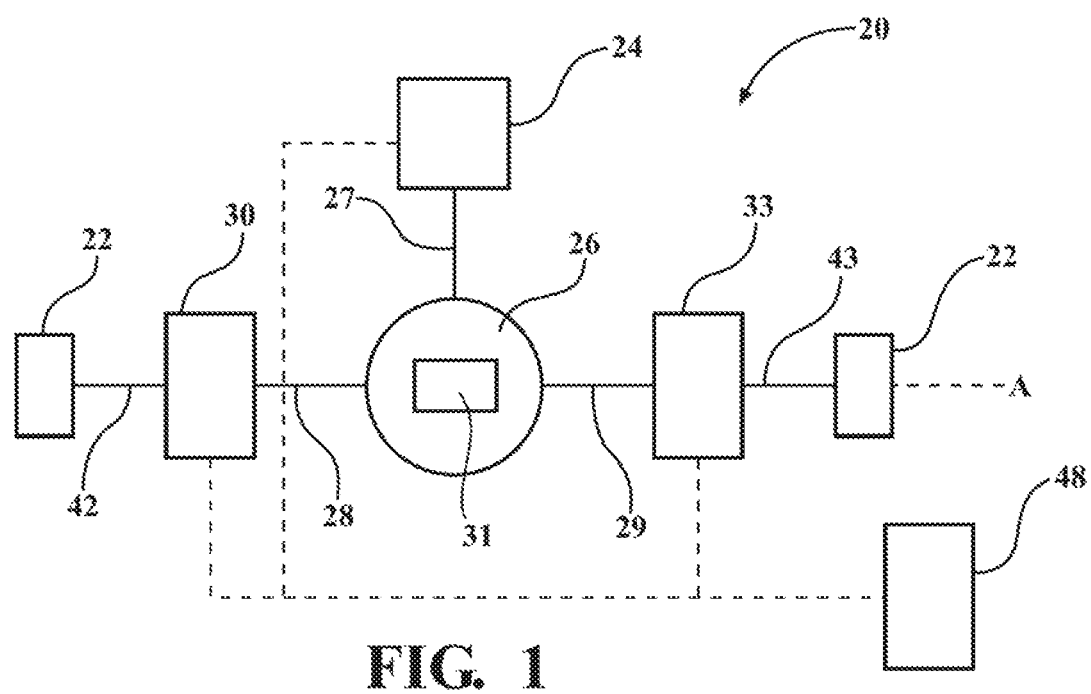
FIG. 1 is a schematic front view of an example embodiment of a driveline assembly including a reducer assembly.

Referring to the Figures, wherein like numerals indicate corresponding parts throughout the several views, a driveline assembly 20 for a vehicle is generally shown. The driveline assembly 20 is configured to drive a pair of wheels 22. It should be appreciated that the subject driveline assembly 20 may be used on various types of vehicles including, but not limited to, automobiles, recreational vehicles and all-terrain vehicles.

The driveline assembly 20 includes an electric motor 24 and a differential 26 coupled with and receiving torque from an output shaft 27 of the electric motor 24. A first primary shaft 28 and a second primary shaft 29 are each rotatably disposed about and along an axis A in axial alignment with one another. The first and second primary shafts 28, 29 are each rotationally coupled with the differential 26. The differential 26 is configured to allow the first and second primary shafts 28, 29 to rotate at different speeds than one another. The differential 26 may be an open differential which always transmits the same amount of torque to each of the primary shafts 28, 29 or a limited slip differential which may be configured to transmit different amounts of torque to the primary shafts 28, 29. More particularly, the differential 26 may include a center clutch 31 that is configured to selectively move between a locked position and an unlocked position, wherein the primary shafts 28, 29 are fixed to rotate at the same speed as one another while the center clutch 31 is in the locked position, and wherein the primary shafts 28, 29 are able to rotate at different speeds relative to one another when the center clutch 31 is in the unlocked position. It should be appreciated center clutch 31 may be various types of clutches including but, not limited to a dog clutch. A controller 48 is electrically connected to the center clutch 31 for selectively shifting the center clutch M. It should be appreciated that the electric motor 24 may be supported along the primary shafts 28, 29 by way of a supporting lubricant and/or bearings.

Figure 2:
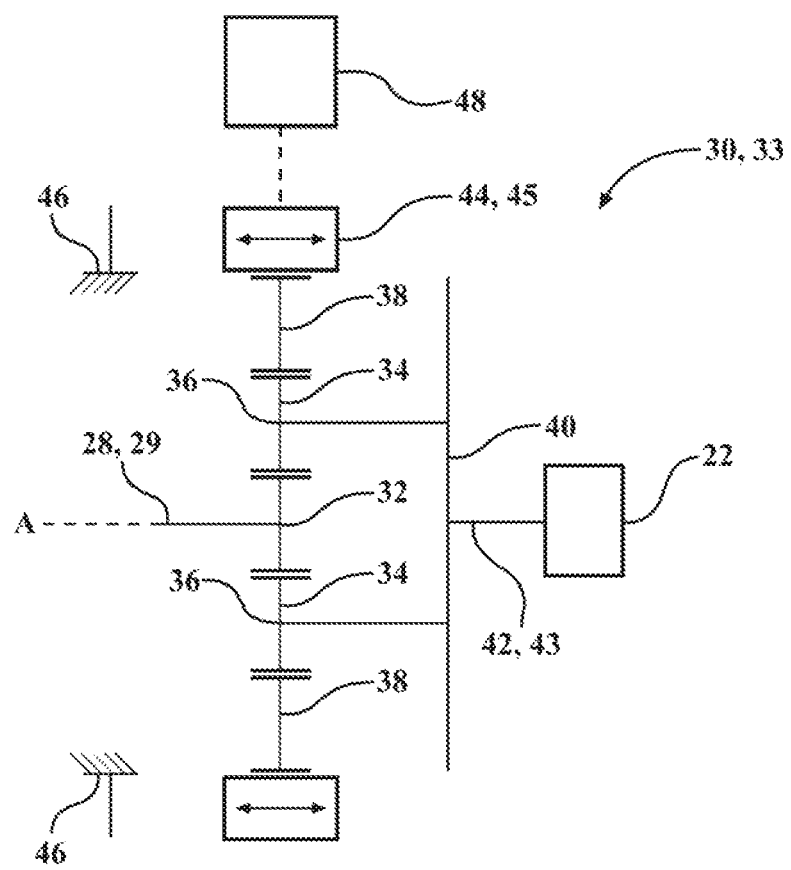
FIG. 2 is a schematic front view of an example embodiment of a reducer assembly.

The first primary shaft 28 is coupled with a first reducer assembly 30 and the second primary shaft 29 is coupled with a second reducer assembly 33. As best illustrated in FIG. 2, each reducer assembly 30, 33 includes a sun gear 32 that is fixed about the respective primary shaft 28, 29 for rotating with the respective primary shaft 28, 29. A plurality of planet gears 34 are positioned about the sun gear 32 and meshed with the sun gear 32. Each of the planet gears 34 defines a center 36. A ring 38 is positioned about the planet gears 34 and meshed with the planet gears 34. A planet carrier 40 is rotatably connected to the center 36 of the planet gears 34 and rotatable about the axis A. A first wheel output 42 is rotationally fixed to the planet carrier 40 of the first reducer assembly 30, and a second wheel output 43 is fixed to the planet carrier 40 of the second reducer assembly 33. The wheel outputs 42, 43 are configured to be coupled with a wheel 22 of the vehicle for transmitting torque to the wheel 22. It should be appreciated that the gears 32, 34, 36, 38 may have various sizes and numbers of teeth to provide various gear ratios.

The first reducer assembly 30 includes a first sliding clutch 44 that is selectively coupled with the ring 38 and the planet carrier 40 of the first reducer assembly 30, as well as a ground 46, e.g., a frame of the vehicle. The second reducer assembly 33 includes a second sliding clutch 45 that is selectively coupled with the ring 38 and the planet carrier 40 of the second reducer assembly 33, as well as the ground 46. Each sliding clutch 44, 45 is axially movable between a high torque position, a low torque position and a neutral position. In the high torque position, the sliding clutch 44, 45 fixes the ring 38 to the ground 46 in order to provide a high gear ratio between the primary shaft 28, 29 and the wheel output, 42, 43, e.g., 7:1, for low speed and high torque demand vehicle operations. In the low torque position, the sliding clutch 44, 45 fixes the ring 38 to the planet carrier 40 in order to provide a 1:1 or other low ratio between the primary shaft and the wheel, e.g., for high speed, low torque demand vehicle operations. In the neutral position, the sliding clutch 44, 45 is disconnected from the ground 46 and the planet carrier 40.

The controller 48 is electrically connected to the first and second sliding clutches 44, 45 for selectively actuating the sliding clutches 44, 45. The controller 48 is configured to synchronize shifting of the sliding clutches 44, 45 at any given time. As will be discussed in further detail below, synchronized shifts of the sliding clutches 44, 45 may be achieved with speed control of the electric motor 24 and are coordinated so all, or any number of the wheels 22 of the vehicle may shift at the same time. The controller 48 is configured to inhibit shifting of the sliding clutches 44, 45 in scenarios in which the speeds of the first and second primary shafts 28, 29 are significantly different, e.g., greater than 50 RPM, due to vehicle turning or spinout conditions. Although in the example embodiment, shifting is accomplished with the sliding clutches 44, 45, it could alternatively be accomplished with a pressure modulated plate clutch. Furthermore, the sliding clutches 44, 45 may be actuated with various types of electric or hydraulic actuators in response to instructions from the controller 48.

Figure 3:
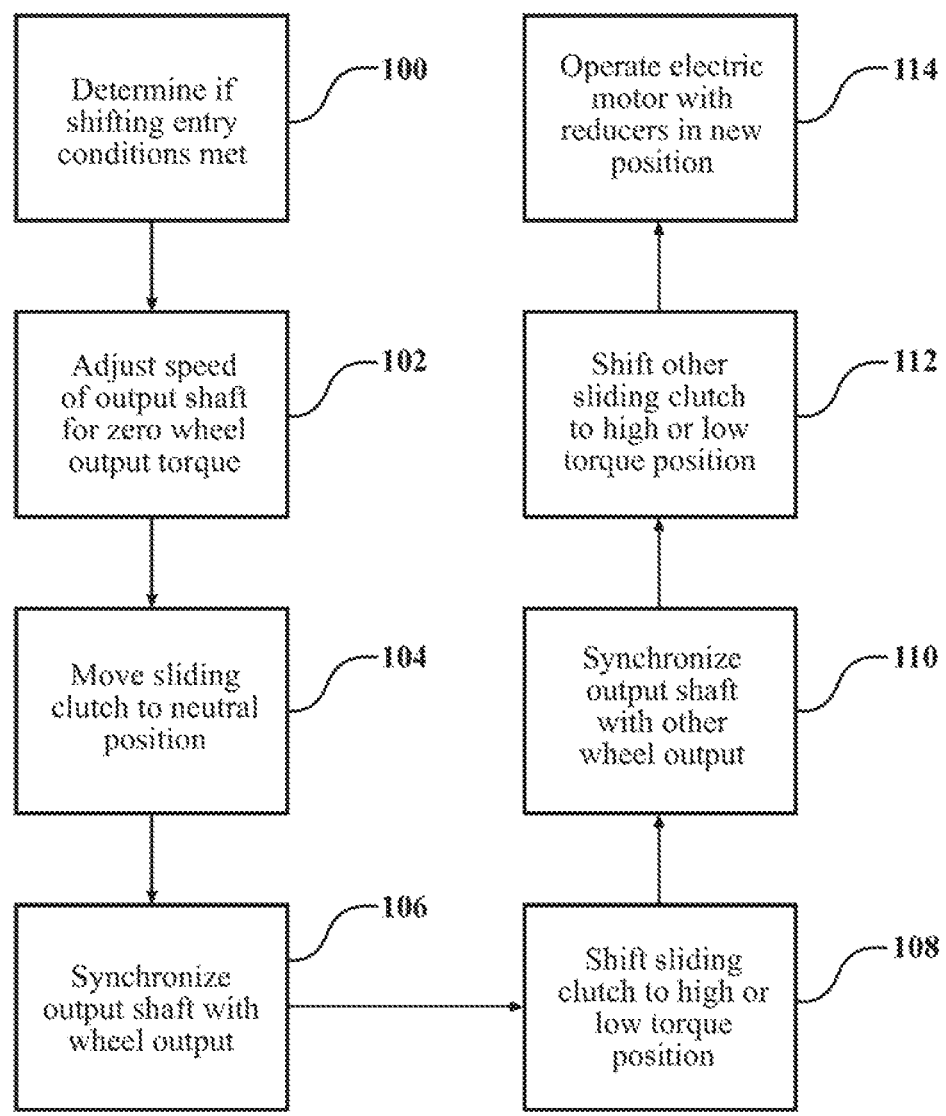
FIG. 3 is a flow diagram presenting a method for synchronized shifting of reducers for a driveline having an open differential.

FIG. 3 presents a method of shifting a driveline assembly that includes an open differential 26. The method starts with 100 determining that certain shifting entry conditions are met. The entry conditions may include, for example, that vehicle speed is at an appropriate range for shifting and that a traction spinout of the wheel outputs 42, 43/tires is not occurring. The method continues with 102 adjusting the speed of the output shaft 27 of the electric motor 24 such that there is zero torque at each of the first and second wheel outputs 42, 43. During this step, the speed of the output shaft 27 will correlate with the current speed of the vehicle. The method continues with 104 moving the sliding clutches 44, 45 of the first and second reducer assemblies 30, 33 to the neutral position such that they do not engage the ground 46 or the planet carrier 40. In the neutral position, the primary shaft 28, 29 is completely rotationally disconnected from the wheel output 42, 43. It should be appreciated that this disconnection could be provided in other ways. The method proceeds with 106 synchronizing the speed of the output shaft 27 with one of the first and second wheel outputs 42, 43. It should be appreciated that due to the action of an open differential and different parasitic friction within the wheel outputs 42, 43, both wheel outputs 42, 43 may not change speed in unison with one another, i.e., the wheel output 42, 43 with the lowest parasitic friction will speed up first in a down shift and the wheel output 42, 43 with the highest parasitic friction will slow down first in an upshift. The method continues with 108 shifting the sliding clutch 44, 45 for the first or second reducer assembly 30, 33 that corresponds with the wheel output 42, 43 that achieves synchronization first. The sliding clutch 44, 45 may be shifted into either the high torque or low torque position. The method proceeds with 110 synchronizing the speed of the output shaft 27 with the other of the wheel outputs 42, 43. The method continues with 112 shifting the sliding clutch 44, 45 for the reducer 30, 33 that corresponds with the other of the wheel outputs 42, 43 into either the high torque or low torque position. Finally, the method continues with 114 operating the electric motor 24 with the reducers 30, 33 in the new clutch position.

Figure 4:
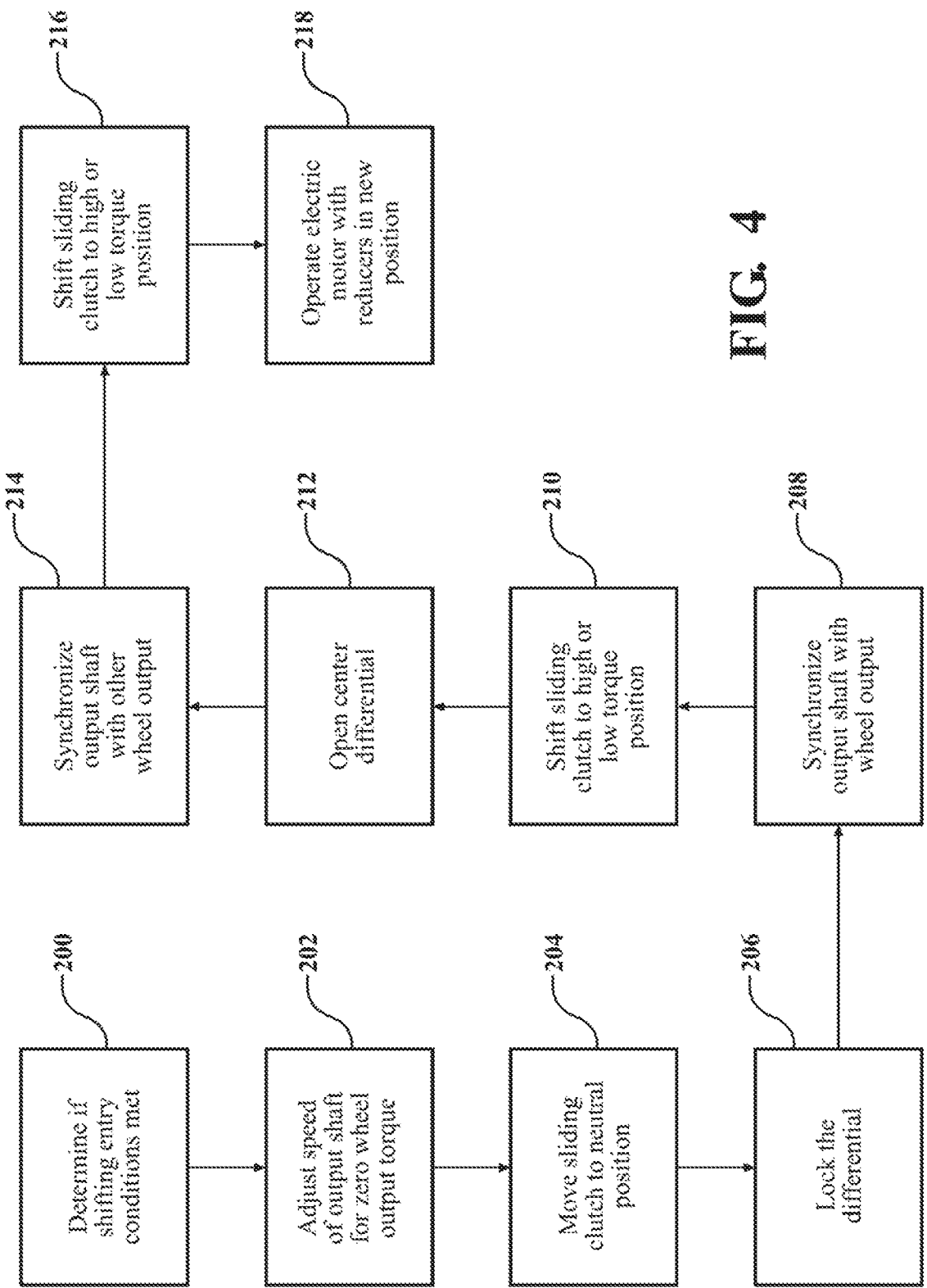
FIG. 4 is a flow diagram presenting a method for synchronized shifting of reducers for a driveline having a lockable differential.

A method of shifting with a driveline assembly 20 that has a synchronized, lockable center differential 26 is presented in FIG. 4. The method starts with the step of 200 determining that certain shifting entry conditions are met. Again, the entry conditions may include, for example, that vehicle speed is at an appropriate range for shifting and that a traction spinout of the wheels 22 is not occurring. The method continues with 202 adjusting the speed of the output shaft 27 of the electric motor 24 such that there is zero torque at each of the first and second wheel outputs 42, 43. During this step, the speed of the output shaft 27 will correlate with the current speed of the vehicle. The method continues with 204 moving the sliding clutches 44, 45 of the first and second reducer assemblies 30, 33 to the neutral position such that it does not engage the ground 46 or the planet carrier 40. The method continues with 206 locking the center clutch 31 of the differential 26 such that the first and second primary shafts 28, 29 rotate at the same speed and distribute the same amount of torque as one another. The method proceeds by 208 driving the electric motor 24 to synchronize its speed with one of the first and second wheel outputs 42, 43. The method continues with 210 shifting the sliding clutch 44, 45 of one of the first and second reducer assemblies 30, 33 to either the high torque or low torque position. The method proceeds with 212 opening the center clutch 31 of the differential 26 to allow the first and second primary shafts 28, 29 to rotate at different speeds relative to one another. The method continues with 214 driving the electric motor 24 to synchronize with the speed of the other of the first and second wheel outputs 42, 43. The method continues with 216 shifting the sliding clutch 44, 45 to either the high or low torque positions for the other of the first and second wheel outputs 42, 43. Finally, the method includes 218 operating the electric motor 24 with the reducers 30, 33 in the new sliding clutch 44 positions.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A method for operating a driveline assembly for a vehicle, the method comprising:

driving an output of an electric motor at a no-torque speed at which no torque is transmitted to a first wheel output and a second wheel output through a differential, and wherein a first primary shaft is coupled with the first wheel output and a second primary shaft is coupled with the second wheel output;

shifting a first sliding clutch into a neutral position, wherein the first sliding clutch is positioned between the first primary shaft and the first wheel output;

shifting a second sliding clutch into a neutral position, wherein the second sliding clutch is positioned between the second primary shaft and the second wheel output;

driving the output of the electric motor such that the speed of the first primary shaft matches the speed of the first wheel output while the first sliding clutch is in the neutral position;

shifting the first sliding clutch from the neutral position into an engaged position while the speed of the first primary shaft matches the speed of the first wheel output, and wherein the first sliding clutch causes a predetermined gear ratio to be provided between the first primary shaft and the first wheel output when the first sliding clutch is in the engaged position;

driving the output of the electric motor such that the speed of the second primary shaft matches the speed of the second wheel output while the second sliding clutch is in the neutral position; and shifting the second sliding clutch from the neutral position into an engaged position while the speed of the second primary shaft matches the speed of the second wheel output, and wherein the second sliding clutch causes a predetermined gear ratio to be provided between the second primary shaft and the second wheel output when the second sliding clutch is in the engaged position.

2. The method as set forth in claim 1 further including determining whether a plurality of wheels of the vehicle are operating in a no-slip configuration prior to driving the output of the electric motor at the no-torque speed.

3. The method as set forth in claim 1 further including shifting a center clutch to a locked position to cause the first and second primary shafts to be fixed for rotation at the same speed as one another prior to driving the output of the electric motor such that the speed of the first primary shaft matches the speed of the first wheel output while the first sliding clutch is in the neutral position.

4. The method as set forth in claim 3 further including shifting the center clutch to an unlocked position to cause the first and second primary shafts to be able to rotate at different speeds than one another after shifting the first sliding clutch from the neutral position into the engaged position while the speed of the first primary shaft matches the speed of the first wheel output and prior to driving the output of the electric motor such that the speed of the second primary shaft matches the speed of the second wheel output while the second sliding clutch is in the neutral position.

* * * * *